(12) United States Patent
Alexander

(10) Patent No.: US 6,601,391 B2
(45) Date of Patent: Aug. 5, 2003

(54) HEAT RECOVERY

(75) Inventor: Donnie W. Alexander, Corpus Christi, TX (US)

(73) Assignee: GeoSol, Inc., Corpus Christi, TX (US)

( * ) Notice: Subject to any disclaimer, the term of this patent is extended or adjusted under 35 U.S.C. 154(b) by 89 days.

(21) Appl. No.: 09/885,323

(22) Filed: Jun. 19, 2001

(65) Prior Publication Data

US 2003/0005697 A1 Jan. 9, 2003

(51) Int. Cl.⁷ .............................................. F01K 25/06
(52) U.S. Cl. ............................ 60/673; 60/676; 60/694
(58) Field of Search .......................... 60/670, 673, 676, 60/694, 654

(56) References Cited

U.S. PATENT DOCUMENTS

| | | | |
|---|---|---|---|
| 3,955,428 A | | 5/1976 | Ward |
| 3,956,061 A | * | 5/1976 | Young et al. ............... 159/48.2 |
| 4,047,386 A | * | 9/1977 | Frondorf ....................... 60/654 |
| 4,132,077 A | | 1/1979 | Johnson |
| 4,238,403 A | * | 12/1980 | Pinto ........................... 518/704 |
| 4,333,313 A | | 6/1982 | Cardone |
| 4,442,675 A | * | 4/1984 | Wilensky ...................... 60/654 |
| 4,573,323 A | * | 3/1986 | Mock ........................... 60/665 |
| 4,729,226 A | | 3/1988 | Rosado |
| 4,805,410 A | | 2/1989 | Johnston |
| 5,040,370 A | | 8/1991 | Rathbone |

* cited by examiner

*Primary Examiner*—Hoang Nguyen
(74) *Attorney, Agent, or Firm*—G. Turner Moller

(57) ABSTRACT

A waste heat recovery system incorporates a contactor for counter current direct heat exchange between a non-condensible gas and a liquid, typically hot water. The water is from a heat source available at the site such as a solar source, a geothermal source, an industrial plant or the like. Hot mainly saturated gas exits from the contactor and drives a motor, typically a turbine. The turbine drive a work consuming device, normally an electric generator. A condenser/separator downstream from the turbine condenses the water vapor and separates the non-condensible gas from the liquid. The liquid from the condenser is preferably recycled or may be discarded.

23 Claims, 2 Drawing Sheets

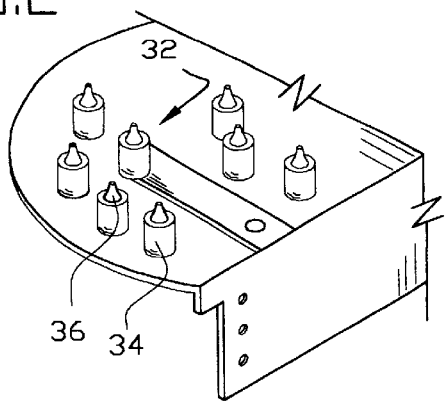
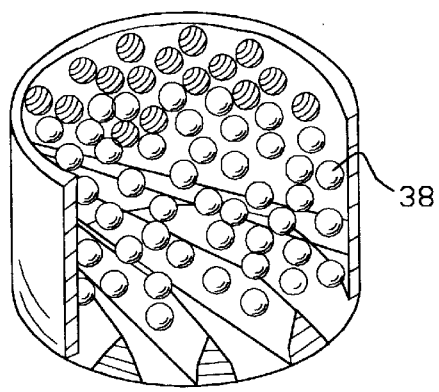
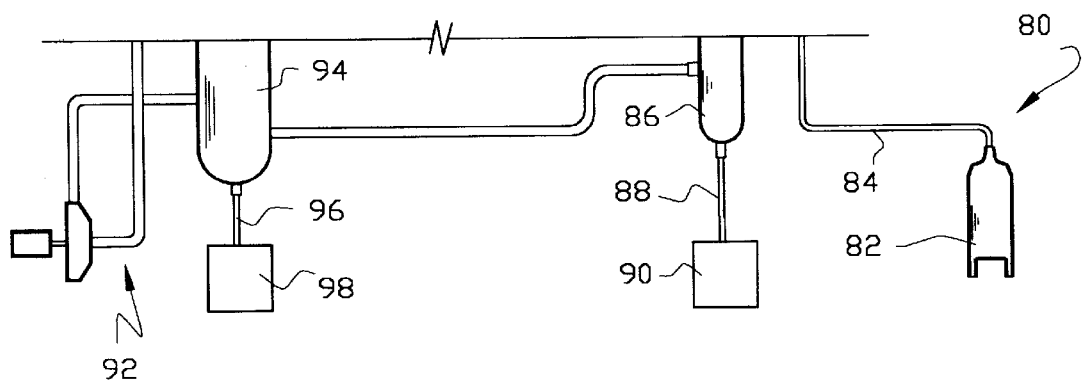
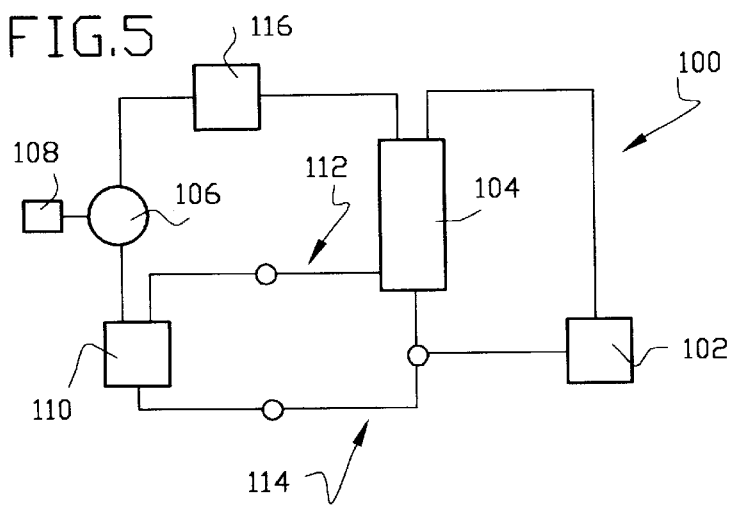

HEAT RECOVERY

This invention relates to a method and apparatus for producing usable energy, and more particularly for producing usable energy from heat sources heretofore inadequate for practical production.

BACKGROUND OF THE INVENTION

There are many sources of thermal energy that have such low temperatures that they are inadequate for the practical production of power using conventional techniques. These heat sources include direct and indirect geothermal energy, solar energy, industrial waste heat and many others.

The state of the art technologies for converting heat sources into electricity do not perform well at temperatures below about 200° Centigrade. This means the vast majority of potential heat sources are not practical energy sources using conventional techniques.

Due to the large amounts of carbon dioxide and other gases in the exhaust of conventional fossil fueled power plants, such power plants have been identified as major contributors to air pollution and the phenomena known as the greenhouse effect within the atmosphere. By successfully utilizing the renewable and non-polluting energy sources such as those mentioned above, the emissions of polluting gases to the atmosphere can be reduced.

Conventional power plants burn coal, natural gas and other fossil fuels to boil water at high pressures. The resulting high-pressure steam is used to drive turbines that are connected to generators. The availability and cost of these fuels make it difficult for most geothermal and impossible for all solar electrical power technologies to compete, given the present state of technology. Large capital costs and the low productivity of renewable energy sources requires renewable energy sources to charge more for electricity than that produced from conventional power plants. An improvement in the efficiency of solar and geothermal power plants and the utilization of heretofore waste heat from industrial processes or operations would be highly desirable.

Thus, the technology of converting low temperature heat sources into usable energy presently lags behind that of conventional power sources when measured by the direct cost of energy output. In addition, the technology of conventional power sources continues to improve, meaning that it is more difficult for renewable energy technologies to become competitive. As in many other situations, the competition is a moving target, improving as time goes on.

A typical geothermal energy driven power plant falls into one of two categories. The first is called direct use in which hot steam from the earth is delivered to turbines which are connected to generators. Typically, the exhaust from the turbines enters a condenser which cools the exhaust vapors to the point where the vapors condense into liquid water. This reduces the exhaust pressure at the outlet and thereby increases the differential pressure across the turbine creating increased horsepower output from the turbine. This allows for smaller turbines to be used for any particular chore. The associated piping and other equipment sizes are lowered respectively, resulting in a lower capital cost for a given power output. However, the heat remaining in gases exiting from the turbine is a considerable fraction of the overall available energy. Consequently, even the most efficient state-of-the-art turbine uses less than half the energy provided by the fuel, the waste heat being delivered to the atmosphere in the form of hot, but relatively low temperature, exhaust gases.

The second basic category of geothermal energy power plant is called a binary process. In this type of process, hot liquids or vapors from the earth are used to heat a second liquid, such as iso-butane, which boils, producing vapors that drive a turbine which is connected to a generator. The exhaust vapors from the turbine are cooled and condensed just as in the direct application described above. Although binary type plants have substantial advantages, a significant proportion of the total energy input is lost in the form of relatively hot water or steam.

Solar energy is used in two general ways to generate heat. The first is a distributed solar collector system in which piping is laid out to absorb energy from the sun. The collector uses transparent plates which allow sunlight to enter the collector, strike the surfaces inside the collector, convert to infrared frequency energy which cannot pass back through the transparent plates. The result is the generation of heat inside the collector which is transferred to the flowing medium inside the pipes, which is typically water. The water becomes hot enough to produce steam when it enters a vessel operating at a lower pressure than the collector piping. The steam is delivered to a turbine driving a generator. Various attempts have been made to promote efficiency, but none are competitive with conventional power plants.

The second type of solar heated power plant is a focused array plant. In this version, mirrors are employed to reflect sunlight on a central receiver. Water passing through piping in the central receiver absorbs the focused sunlight producing high temperatures in the piping. The water boils into high pressure steam delivered to a turbine driving a generator. The array of mirrors tracks the sun via a sophisticated drive system. This type system is expensive.

A third method of converting sunlight into electricity is the photovoltaic method. In this technique, sunlight striking a specially designed material is converted directly into electricity. Large improvements have been made in this technique, but it remains uncompetitive compared to conventional power plants.

The problem is a combination of economics and thermodynamics. If the temperature of the waste water or steam is high enough, there are conventional techniques available to utilize some of the heat economically. Chemical plants and refineries grow like topsy, based in part on the utilization of waste process heat and/or byproducts from older installations. The problem is there is a huge amount of heat at temperatures so low that they cannot be economically used by conventional techniques. On reflection, it will become apparent that every situation where heat is used to generate power results in a quantity of waste heat that cannot be used by current techniques.

Disclosures relevant to the disclosure of this invention are found in U.S. Pat. Nos. 3,955,428; 4,132,077; 4,333,313; 4,729,226; 4,805,410 and 5,040,370.

SUMMARY OF THE INVENTION

In this invention, some of the heat from a heretofore uneconomic source may be economically used by directly contacting a liquid from the source with a gas to heat and saturate the gas. This is done in a counterflow contactor, with the liquid typically moving downward and the gas moving upward. The hot gas exits from the contactor and is delivered into the inlet of a motor, typically a turbine which is driven by the heated gas. The turbine typically drives an electrical generator but may be used to drive any other suitable device, depending on the circumstances in which the heat recovery system of this invention is used.

The gas exits from the turbine exhaust into a low pressure condensing vessel where the liquid condenses and separates from the gas. The condensing liquid provides a low pressure discharge for turbine. The gas is delivered into the inlet of a gas compressor and compressed so it will circulate through the contactor. In a preferred embodiment of the invention, the liquid from the condenser may be recirculated through the heat source and thereby use the heat it still contains or the condense liquid may be delivered to a cooling pond or otherwise discarded.

This invention allows the economic use of heat from heretofore impractical sources to be converted into electricity or other usable energy.

It is an object of this invention to provide an improved heat recovery system and process.

A further object of this invention is to provide a heat recovery system and process using a contactor to heat and saturate a gas with a liquid.

Another object of this invention is to provide a heat recovery system and process providing improved efficiencies of operation.

These and other objects and advantages of this invention will become more apparent as this description proceeds, reference being made to the accompanying drawings and appended claims.

BRIEF DESCRIPTION OF THE DRAWINGS

FIG. 2 is an enlarged view of a section of the interior of the contactor;

FIG. 3 is an enlarged view of a section of the interior of another embodiment of this invention;

FIG. 4 is a partial schematic view of a heat recovery system of this invention showing an alternative heat source; and FIG. 5 is a partial schematic view of a addition to the heat recovery system of this invention.

DETAILED DESCRIPTION

Figure 1:
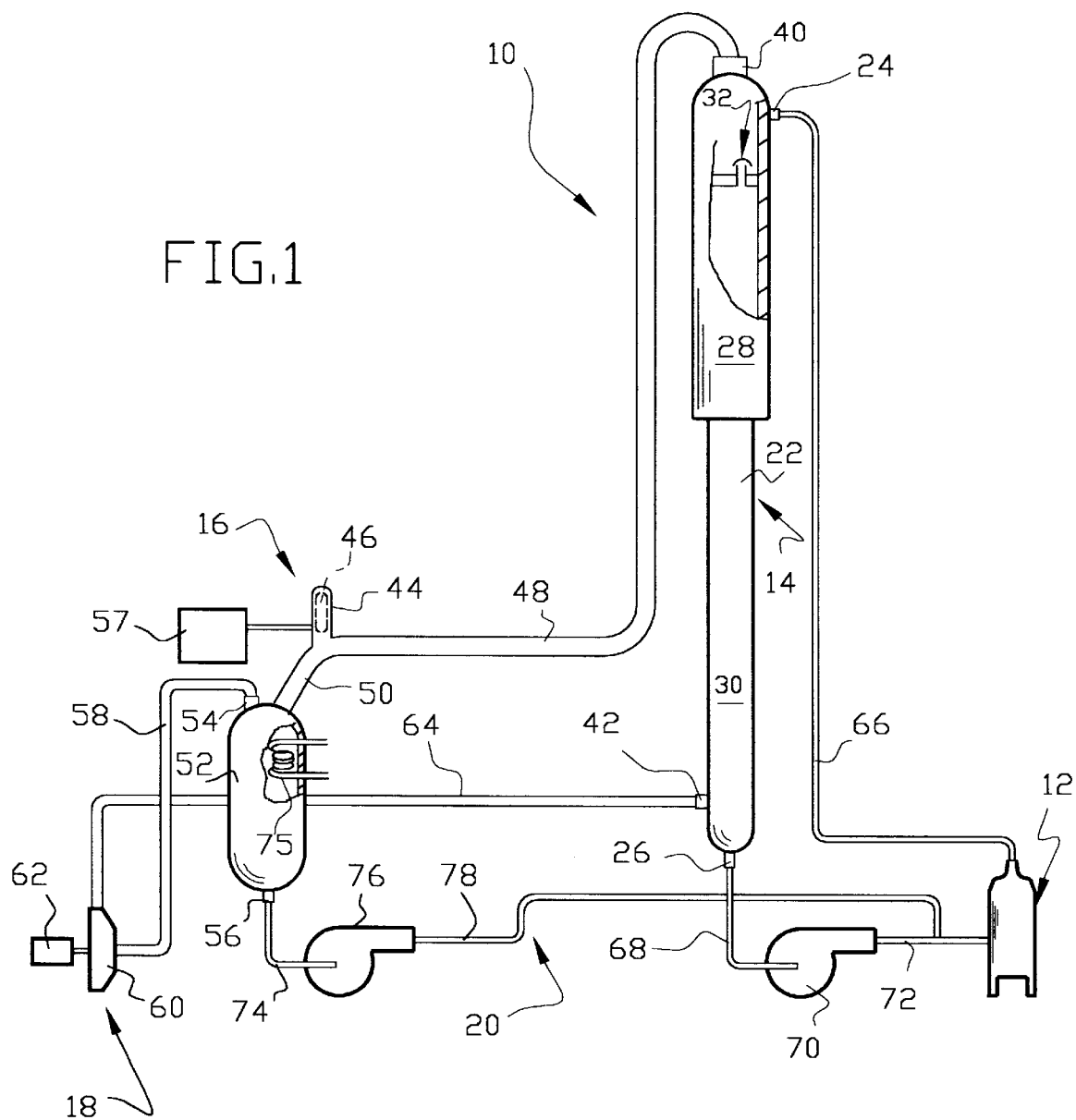
FIG. 1 is a schematic view of a heat recovery system of this invention.

Referring to FIGS. 1–2, the heat recovery system 10 of this invention comprises, as major components, a heat source 12, a contactor 14, a motor 16, a system 18 for circulating a gas through the system 10 and a system 20 for circulating a liquid through the system 10.

The heat source 12 may be selected from one of many types, depending on the conditions and opportunities that appear at a site of the system 10. The heat source 12 may be a geothermal source, a solar source, waste heat from an industrial operation, such as a chemical plant, refinery or conventional electrical power plant, a heat pump extracting heat from another source, or the like. Typically, the temperature of the heat source 12 is not so high that conventional heat recovery systems are economic. As shown in FIG. 1, a heat transfer liquid is circulated in heat exchange relation through the heat source 12 to provide a relatively hot liquid.

The contactor 14 is similar to those used in refineries to contact a liquid and a gas and comprises a vessel 22 having a liquid inlet 24 and a liquid outlet 26. The vessel 22 includes an enlarged upper end 28 and a smaller lower end 30 to minimize pressure losses in the vessel 22 as will be more fully apparent hereinafter. Inside the vessel 22 are one or more devices 32 used to promote intimate contact between the heated liquid from the source 12 and a non-condensible gas, which is typically nitrogen or air. As shown in FIG. 2, the devices 32 may comprise conventional bubble trays having a perforated plate providing vertical flow tubes 34 and bubble caps 36 causing a flow reversal of upwardly flowing gas and downwardly flowing liquid. The contact promoters 32 may be of any other suitable type, such as random packing 38 shown in FIG. 3, valve trays or other similar devices used to increasing contact between the liquid and gas. Contact promoters are used in refineries, chemical plants and the like and are commercially available in a wide variety of types from vendors such as Jaeger Products, Inc. of Houston, Tex. The contactor 14 also includes a gas outlet 40 and a gas inlet 42 as will become apparent. Liquid flow through the contactor 14 is downward by gravity. It will be seen that heat exchange inside the contactor 14 is of the direct type, i.e. the liquid and gas are in direct, intimate contact. There is no more efficient heat transfer mechanism known.

As will become more fully apparent hereinafter, the degree to which the non-condensible gas becomes saturated with the liquid has a substantial effect on the capacity of the gas stream to produce work. Accordingly, the non-condensible gas stream should be at least 50% saturated with the liquid and preferably be at least 90% saturated. Theoretically, the gas stream is most efficient when it is completely saturated with the liquid. As a practical matter, complete continuous saturation is not so easily achieved and optimal saturation, given the cost of equipment and operation, appears to be in the middle to high 90% range.

The motor 16 may be any suitable type such as piston engine or the like but is preferably a turbine having a housing 44 and an impeller 46 in a conduit 48 comprising part of the gas circulating system 18. The housing 44 includes an exhaust 50 opening into a vessel 52 comprising a separator/condenser where liquid vapor in the gas is condensed and separated into gas exiting through a gas outlet 54 and liquid exiting through a liquid outlet 56. The turbine includes an output shaft connected to an electrical generator or other energy consuming device 57.

Gas exiting from the separator/condenser 52 flows through a conduit 58 to a compressor 60 driven by a motor 62. Compressed gas exits from the compressor 60 and flows through a conduit 64 to the gas inlet 42 of the contactor 14. It will be seen that the circulating system 18 comprises the conduits 48, 50, 64 and the compressor 60.

The liquid circulating system 20 includes a conduit 66 delivering hot liquid from the heat source 12 to the liquid inlet 24 of the contactor 14, a conduit 68 delivering liquid from the contactor outlet 26, and a pump 70 delivering liquid through an outlet 72 to the heat source. The liquid circulating system 20 also includes a conduit 74 delivering liquid from the separator/condenser outlet 56 and a pump 76 having an outlet 78 connected to the outlet 72 for delivering condensed liquid to the heat source 12.

Under some conditions, the temperature of the condensed liquid in the separator/condenser 52 is warmer than the liquid exiting from the contactor 14 through the liquid outlet 26. This may occur under a variety of conditions, e.g. when the vessel 52 is painted black to absorb solar radiation and there is sufficient residence time in the separator/condenser or where the process conditions are less than optimal. For example, the efficiency of the motor 16 may be such that the condensed liquid is considerably warmer than liquid emitting from the contactor. In this situations, delivering the condensed liquid to the contactor at a location where the temperature of the condensed liquid is the same as or greater than the temperature of the contactor liquid provides increased thermal efficiencies.

In the closed loop version of the waste heat recovery system 10 shown in FIG. 1, the liquid used is preferably distilled or demineralized water. The gas is non-condensible at operating temperatures which is defined to be above 125° F. and is conveniently air or a non-corrosive gas such as argon or preferably nitrogen. It will be apparent that other gases or gas mixtures are equally operative.

In use, the system 10 is filled with an appropriate amount of the liquid and to an appropriate pressure with the gas. The compressor 60 draws a suction on the separator/condenser 52 and delivers the gas into the lower end of the contactor 14 and travels upwardly through the vessel 22. In doing so, the gas comes in intimate and direct contact with heated liquid flowing by gravity in a counter current direction from the top of the vessel 22 to the bottom. The rate of movement of the liquid is controlled largely by the size of the vessel 22 and the design of the contact promoters 32. The gas, which is cooler than the down flowing liquid is thereby heated. The gas expands in accordance with its temperature and, in addition, due to the absorption of vapor of the liquid. As the gas continues to travel upward in the contactor 14, it becomes hotter, expands, and vaporizes more of the liquid. When the gas arrives at the gas outlet 40 it is near the saturation point and near the temperature of the incoming liquid. Due to heating of the gas and charging it with vapor from the liquid, the energy content of the gaseous stream leaving the contactor 14 is substantially greater than when it entered the vessel 22. A velocity profile of the upwardly moving gas inside the upper end of the contactor 14 shows that the velocity of the gas increases substantially with height. In other words, the velocity of the gas is considerably higher at the top of the contactor 14 than it is at the bottom. The contactor vessel 22 is sized considerably larger at the top than at the bottom to control the velocity of the gaseous stream below an acceptable limit to minimize entrainment of droplets in the upward moving stream.

The gaseous stream flows through the conduit 48 into the turbine 16 at high velocity and volume. The turbine 16 is caused to rotate by the energy in the gaseous stream and drives the generator or other energy consuming device to which it is connected. The gaseous stream is cooled by the effect of creating rotational energy in the turbine. This causes the gaseous stream to shrink and the pressure to drop. Much of the vaporized liquid in the gaseous stream condenses and separates from the non-condensible gas inside the separator/condenser 52. Liquid from the bottom of the condenser/separator 52 is pumped through the conduit 78 to the heat source 12 where the liquid is reheated and delivered again to the contactor liquid inlet 24. Gas from the condenser/separator outlet 54 is repressured by the compressor 60 and delivered to the contactor gas inlet 42 and the cycle is repeated.

The condenser/separator 52 is preferably artificially cooled to reduce the exhaust pressure of the turbine 16 and thereby produce a greater pressure drop across the impeller 46 and to cool the exhaust stream to promote condensation of the liquid and thereby promote separation of the liquid and gas fractions. This may be accomplished using a variety of techniques, such as spraying cool water from the bottom of the contactor 14 into the condenser 52.

Preferably, a coil 75 may be provided in the upper end of the condenser 52 for cooling the turbine exhaust for condensing the liquid vapor and thereby cause additional contraction of the gaseous stream and condensing of the vaporized liquid therein. The liquid circulating in the coil 75 is preferably water and, under appropriate conditions, may be delivered to the contactor 14 or to the liquid delivery system 20 at a location where the temperature of the condenser liquid matches the temperature of the liquid in the system, thereby conserving heat removed from the turbine exhaust vapors.

The temperature of the water accumulating in the bottom of the contactor 14 is a function of the contact time between the liquid and the gas, the temperature of the water entering the top of the vessel and the temperature of the gas entering the bottom of the vessel and the ratio of the flow of the water to the flow of the gas.

The amount of heat removed from the gaseous stream leaving the top of the contactor vessel is a function of the efficiency of the turbine 16 plus the amount of supplemental cooling provided by the cooling coils 74 inside the condenser/separator. It will accordingly be seen that the system 10 extracts heat from a source and efficiently converts that heat into usable work.

Referring to FIG. 4, a one-time through liquid system is illustrated where a waste heat recovery system 80 of this invention includes a heat source 82 delivering hot liquid through a conduit 84 to a contactor 86. Cool liquid from the contactor 86 is returned through a conduit 88 to a cooling pond 90 or other disposal area. Gas from a gas recirculating system 92 passes into the bottom of the contactor 86 and flows upwardly in counter current direction to the down flowing liquid. The system 80 is used in situations where design parameters suggest one time use of the liquid.

One example of the use of the system 80 is the use of filtered salty or brackish water as the liquid. When salty or brackish water is heated in the source 12 and passes into the contactor 86, some of it vaporizes in the moving gas stream, passes through the turbine and is condensed as fresh water in the condenser/separator 94. Fresh water accumulating in the condenser/separator 94 is delivered through a conduit 96 to a suitable water using system 98. Thus, the water exiting through the conduit 88 to the disposal area 90 is slightly more brackish than the inlet water.

Referring to FIG. 5, another feature of this invention is illustrated. There are a number of situations where heat sources of high temperature are available but the total amount of heat is too small to provide an economic heat recovery installation using conventional techniques. Such situations are well adapted for use in this invention as shown in FIG. 5 where a system 100 of this invention comprises a relatively low temperature heat source 102, a contactor 104, a motor 106 driving an energy consumer 108, a condenser/separator 110, a gas delivery system 112 and a liquid delivery system 114, as heretofore described. A source 116 of high temperature but low total heat is placed in indirect heat exchange relation with the hot, mostly saturated, gas emitting from the contactor 104. Using the high temperature source to raise the temperature of the hot mainly saturated gaseous stream from the contactor provides further thermal efficiencies as will be apparent to those skilled in the art.

The following table illustrates the effect of saturating air with water at elevated temperatures.

TABLE I cubic feet per pound of air at % relative humidity at 50 psig

| temp deg °F. | 90% RH | 93% RH | 96% RH | 99% RH |
|---|---|---|---|---|
| 230 | 259 | 268 | 276 | 285 |
| 240 | 598 | 618 | 638 | 658 |
| 250 | 1299 | 1342 | 1386 | 1329 |
| 260 | 2665 | 2753 | 2842 | 2931 |
| 270 | 5192 | 5365 | 5538 | 5711 |
| 280 | 9672 | 9994 | 10316 | 10638 |
| 290 | 17318 | 17895 | 18472 | 19049 |
| 300 | 29951 | 30949 | 31947 | 32946 |
| 310 | 50234 | 51908 | 53592 | 55257 |

In comparison, a pound of dry air at 230° F. and 50 psig has a volume of 4 cubic feet. It will accordingly be apparent that air saturated, or mainly saturated, with water vapor has a much greater capacity to do work.

Although a common application of this invention is in the recovery of waste, or low temperature, heat from sources now believed to be uneconomic, this invention provides improved thermal efficiencies using heat sources of high temperatures and pressures.

Although this invention has been disclosed and described in its preferred forms with a certain degree of particularity, it is understood that the present disclosure of the preferred forms is only by way of example and that numerous changes in the details of operation and in the combination and arrangement of parts may be resorted to without departing from the spirit and scope of the invention as hereinafter claimed.

I claim:

1. A heat recovery system comprising a source of hot liquid, a contactor for directly transferring heat from the hot liquid to a gas, piping for delivering the hot liquid from the source to the contactor, a conduit for delivering a non-condensible gas counterflow to the hot liquid in the contactor for delivering a hot gas, at least partially saturated with the liquid, from the contactor and a motor operated by the hot gas for driving an energy consuming device, and a vessel for condensing the liquid and separating the liquid from the gas, the vessel being downstream of the motor.

2. The combination of claim 1 wherein the gas delivering means comprises a system for circulating the gas in a closed loop through the contactor and through the motor.

3. The combination of claim 1 wherein the system for delivering the gas comprises a compressor having an inlet connected to the vessel and an outlet connected to the contactor.

4. The combination of claim 1 wherein the motor provides a rotating output shaft.

5. The combination of claim 4 wherein the motor comprises a turbine.

6. The combination of claim 1 wherein the source of hot liquid comprises a heat source and a system for circulating a liquid through the heat source.

7. The combination of claim 1 wherein the source of hot liquid comprises a source of waste heat from a plant operation.

8. The combination of claim 1 wherein the source of hot liquid comprises a geothermal source.

9. The combination of claim 1 wherein the source of hot liquid is a solar powered source.

10. The combination of claim 1 wherein the source of hot liquid is an industrial plant.

11. The combination of claim 10 wherein the industrial plant is a power plant.

12. The combination of claim 1 wherein the energy consuming device comprises an electrical generator.

13. A heat recovery system comprising a source of hot liquid, a contactor for directly transferring heat from the hot liquid to a gas, piping for delivering the hot liquid from the source to the contactor, a conduit for delivering a non-condensible gas counterflow to the hot liquid in the contactor for delivering a hot gas, at least partially saturated with the liquid, from the contactor and a motor operated by the hot gas for driving an energy consuming device, the contactor comprising a vessel having a liquid inlet adjacent an upper end thereof, a liquid outlet adjacent a lower end thereof, a gas inlet adjacent a lower end thereof and a gas outlet adjacent an upper end thereof and gas-liquid contact promoters inside the vessel promoting contact between the gas and the liquid.

14. The combination of claim 13 wherein the gas-liquid contact promoters comprise bubble trays.

15. The combination of claim 13 wherein the gas-liquid contact promoters comprise round objects in the contactor.

16. A method of recovering heat from a source comprising passing a liquid from the source through a contactor and passing a non-condensible gas in the contactor in direct heat exchange to the liquid and thereby directly transferring heat from the hot liquid to the gas and at least partially saturating the gas with the liquid, and then driving a motor with the hot saturated gas and wherein the gas in the contactor is moving upwardly and the liquid in the contactor is moving downwardly and the velocity of the gas adjacent an upper end of the contactor is greater than the velocity of the gas adjacent a lower end of the contactor.

17. The method of claim 16 further comprising condensing the liquid downstream of the motor and thereby creating a low pressure exhaust for the motor.

18. The method of claim 16 wherein the liquid is selected from the group of distilled water and demineralized water.

19. The method of claim 16 wherein the liquid is water having therein a quantity of salt and further comprising the steps of delivering vaporized water to the motor and then condensing the vaporized water into salt free liquid water.

20. The method of claim 16 wherein part of the increase in gas velocity is due to heating of the gas and part of the increase in gas velocity is due to partial vaporization of the liquid.

21. The method of claim 16 wherein the gas flows counter current to the liquid.

22. A method of recovering heat from a source comprising passing a liquid from the source through a contactor and passing a non-condensible gas in the contactor in direct heat exchange to the liquid and thereby directly transferring heat from the hot liquid to the gas and at least partially saturating the gas with the liquid, and then driving a motor with the hot saturated gas wherein the non-condensible gas exiting from the contactor is at least 50% saturated with the liquid.

23. The method of claim 22 wherein no non-condensible gas exiting from the contactor is at least 90% saturated with the liquid.

* * * * *